(12) United States Patent
Kouda (10) Patent No.: US 7,874,313 B2
(45) Date of Patent: Jan. 25, 2011

(54) PIPE COUPLING

(75) Inventor: Toru Kouda, Tokyo (JP)

(73) Assignee: Nitto Kohki Co., Ltd., Tokyo (JP)

( * ) Notice: Subject to any disclaimer, the term of this patent is extended or adjusted under 35 U.S.C. 154(b) by 257 days.

(21) Appl. No.: 12/227,598

(22) PCT Filed: May 24, 2007

(86) PCT No.: PCT/JP2007/060578

§ 371 (c)(1),
(2), (4) Date: Nov. 21, 2008

(87) PCT Pub. No.: WO2007/136110

PCT Pub. Date: Nov. 29, 2007

(65) Prior Publication Data

US 2009/0283162 A1   Nov. 19, 2009

(30) Foreign Application Priority Data

May 24, 2006   (JP) .............................. 2006-144332

(51) Int. Cl.
*F16L 37/32* (2006.01)
(52) U.S. Cl. ............................ 137/614.03; 137/614.05; 251/149.2
(58) Field of Classification Search ............... 137/614.02–614.05; 251/149.2, 149.6
See application file for complete search history.

(56) References Cited

U.S. PATENT DOCUMENTS 3,279,497 A * 10/1966 Supinger et al. ........ 137/614.03
4,473,211 A * 9/1984 Fremy .................... 251/149.2
5,090,448 A * 2/1992 Truchet .................. 137/614.03
6,089,539 A    7/2000 Kouda (Continued)

FOREIGN PATENT DOCUMENTS

JP    2-154889    6/1990

(Continued)

OTHER PUBLICATIONS

International Search Report issued Jun. 19, 2007 in the International (PCT) Application of which the present application is the U.S. National Stage.

*Primary Examiner*—Kevin L Lee
(74) *Attorney, Agent, or Firm*—Wenderoth, Lind & Ponack, L.L.P.

(57) ABSTRACT

At least one coupling member (2) has a slide valve holder (42) that is pushed in by the other coupling member (3) when coupled to the coupling member (2). The coupling member (2) further has a rotary valve (41) rotatably supported by the slide valve holder. The slide valve holder has a through-hole (425) constituting a flow path. A valve seat (26) is provided around the through-hole. The rotary valve (41) has an outer peripheral surface portion that slidingly engages the valve seat. One end of a fluid passage (411) extending through the rotary valve is open on the outer peripheral surface portion. The rotary valve is displaceable toward the valve seat and is urged toward the valve seat by a spring member (64). Thus, the outer peripheral surface portion is pressed against the valve seat. When a fluid pressure acts in the coupling member (2) when the coupling members (2, 3) are not coupled to each other, the fluid pressure presses the rotary valve toward the valve seat.

9 Claims, 12 Drawing Sheets

U.S. PATENT DOCUMENTS

| | | |
|---|---|---|
| 7,028,982 B2 | 4/2006 | Kohda |
| 7,070,164 B2 | 7/2006 | Kohda |
| 7,118,089 B2 | 10/2006 | Mikiya et al. |

FOREIGN PATENT DOCUMENTS

| | | |
|---|---|---|
| JP | 11-108279 | 4/1999 |
| JP | 2004-176755 | 6/2004 |
| JP | 2005-127376 | 5/2005 |
| JP | 2005-127377 | 5/2005 |

* cited by examiner

PIPE COUPLING

TECHNICAL FIELD

The present invention relates to a pipe coupling comprising a male coupling member and a female coupling member that are detachably connected to each other.

BACKGROUND ART

There have been proposed a wide variety of pipe couplings using a rotary valve as a valve structure that opens and closes a fluid passage.

A conventional pipe coupling of this type is arranged as follows. A slide valve holder that rotatably supports a rotary valve member is provided in a tubular body constituting a female coupling member. The slide valve holder is kept in an advance position by a spring when a male coupling member is not connected to the female coupling member. When the male coupling member is connected to the female coupling member, the slide valve holder is retracted by the male coupling member. In response to the movement of the slide valve holder, the rotary valve member rotates from an open position for opening the flow path to a closed position for closing the flow path.

The slide valve holder is provided with a through-hole constituting the flow path. An annular valve seat is formed around the through-hole. The rotary valve member rotates between the open position and the closed position while sliding, at its outer peripheral surface, relative to the valve seat. In the open position, a through-hole formed in the rotary valve member aligns with the flow path, thereby opening the flow path. In the closed position, the through-hole is out of alignment with the flow path, thereby closing the flow path (Japanese Patent Application Publication No. 2004-176755).

When the rotary valve member is rotated, it slides relative to the valve seat. To reduce the sliding resistance encountered when the rotary valve member is rotated, a conventional technique proposes a pipe coupling in which the peripheral surface of the rotary valve member has an annular surface portion that sealingly engages the valve seat when the rotary valve member is in the open position, thereby preventing leakage of fluid from between the flow path and the through-hole aligned with each other at that time. The rest of the peripheral surface of the rotary valve member is smaller in radius than the annular surface portion. With this structure, the conventional pipe coupling reduces the sliding resistance encountered when the rotary valve member is rotated (Japanese Patent Application Publication No. 2005-127377).

Patent Document 1: Japanese Patent Application Publication No. 2004-176755

Patent Document 2: Japanese Patent Application Publication No. 2005-127377

DISCLOSURE OF THE INVENTION

Problem to be Solved by the Invention

The present invention aims at reducing the sliding resistance encountered when the rotary valve member is rotated, as in the case of the invention disclosed in the above-described patent application publication.

When the female and male coupling members are not coupled to each other, the rotary valve member is placed in the closed position. It is general practice that when the female and male coupling members are not coupled to each other, the fluid pressure in a flow path system to which the coupling member concerned is connected is kept from acting in the coupling member. The present invention makes good use of this fact. That is, an object of the present invention is to provide a pipe coupling wherein when the female and male coupling members are not coupled to each other and the fluid pressure in the coupling member concerned is low, the pressing force of the rotary valve member against the valve seat is reduced to thereby reduce the sliding resistance offered by the valve seat to the rotation of the rotary valve member caused by an operation of coupling together the female and male coupling members, and when a fluid pressure acts in the coupling member, the rotary valve member is strongly pressed against the valve seat by utilizing the fluid pressure, thereby obtaining a proper seal.

MEANS FOR SOLVING THE PROBLEM

That is, the present invention provides a pipe coupling (1) having a female coupling member and a male coupling member (denoted by reference numerals 2 and 3, respectively, in the following embodiments) that are connected to each other. At least one coupling member (2) includes a tubular body (21) configured to receive the other coupling member from one end thereof, and a slide valve holder (42) set in the tubular body (21) slidably in the axial direction of the tubular body. The slide valve holder is slidable between a closed position (shown in FIGS. 1 to 3 in the following first embodiment) and an open position (shown in FIGS. 4 to 6) where the slide valve holder is pushed rearward of the closed position by the other coupling member (3) inserted into the tubular body. The slide valve holder has a through-hole (425) constituting a flow path extending in the axial direction of the slide valve holder and an annular valve seat (26) provided around the through-hole. The coupling member (2) further includes a rotary valve (41) having an outer peripheral surface portion that sealingly engages the valve seat and a fluid passage (411) extending through the rotary valve and opening at one end thereof on the outer peripheral surface portion. The rotary valve (41) is rotatable about a pivot axis extending in a direction perpendicular to the axial direction of the slide valve holder (42) while the outer peripheral surface portion thereof slides on the valve seat (26). When the slide valve holder is in the open position (FIGS. 4 to 6), the fluid passage (411) aligns with the through-hole (425) of the slide valve holder (42) to open the flow path. When the slide valve holder (42) is in the closed position (FIGS. 1 to 3), the fluid passage (411) is out of alignment with the through-hole (425) of the slide valve holder to close the flow path. Further, the coupling member (2) includes a spring member (spring member 64 in the first embodiment; coil spring 23 in the second embodiment; or spring member 65 in the third embodiment) that presses the rotary valve against the valve seat. The rotary valve (41) is displaceable in the axial direction of the slide valve holder (42), so that the rotary valve (41) can be pressed against the valve seat (26) by the fluid pressure in the coupling member in addition to the pressing force from the spring member.

As has been stated above, the pipe coupling is designed so that when the male and female coupling members are not coupled to each other and hence the rotary valve is in the closed position, no fluid pressure acts in these coupling members. Therefore, in the decoupled state, the pressing force applied from the spring member to press the rotary valve against the valve seat need not be very large. Accordingly, it is possible to reduce the sliding resistance offered by the valve seat to the rotary valve when the male and female coupling members are coupled and decoupled. When a fluid pressure acts in the coupling member, however, the rotary valve is further pressed against the valve seat by the fluid pressure. Accordingly, more reliable sealing can be obtained.

Specifically, the pipe coupling may be arranged as follows. The rotary valve (41) has a pair of pivot members (61) projecting therefrom along the pivot axis. The slide valve holder (42) has pivot holes (62) that receive the pivot members (61), respectively. Each pivot hole has a length in the axial direction of the slide valve holder that is longer than the diameter of the pivot members (61), so that the rotary valve is displaceable in the axial direction of the slide valve holder and can be pressed against the valve seat by a fluid pressure in the tubular body.

In this case, the spring member (64 or 65) may be provided between the slide valve holder and each pivot member to urge the pivot member forward, thereby pressing the rotary valve against the valve seat.

Specifically, the spring member (64) may be set in the slide valve holder (42) so as to extend across the associated pivot hole (62), so that when the slide valve holder is in the closed position (FIGS. 1 to 3), the spring member engages the rear surface of the pivot member (61) in the pivot hole (62) to press the rotary valve against the valve seat through the pivot member.

More specifically, the pipe coupling may be arranged as follows. The slide valve holder (42) is provided with a pair of grooves (63) extending from each of the pivot holes (62) in opposite lateral directions and in fore-and-aft directions relative to the pivot holes. The spring member (64) is an elongated spring set in the slide valve holder by engaging both ends thereof in the pair of grooves (63).

Even more specifically, the arrangement may be as follows. The pair of grooves extend in opposite lateral directions and forwardly while curving so that the forward ends of the grooves come close to each other, thus forming a C-shape configuration which extends from one of the pair of groove to an other of the same through of the pivot. The spring member (64) is a C-shaped spring set in the slide valve holder (42) by expanding the spring to make opposite ends thereof far away from each other and fitting the ends of the spring into the pair of grooves (62), respectively.

As another specific example, the spring member (23) may be set between the tubular body (20) and the pivot members (61) to urge the slide valve holder (42) toward the closed position (FIG. 7 to 9) through the pivot members (61).

As still another specific example, the pipe coupling may be arranged as follows. The slide valve holder (42) has a spring receiving part (66) that is contiguous with the rear end of each pivot hole (62), and the spring member (65) is received in the spring receiving part (66) in engagement with the pivot member in the pivot hole.

In this case, the spring member (65) may be a U-shaped spring having a pair of parallel leg portions and a central portion that connects together the leg portions. The U-shaped spring is received in the spring receiving part such that the pair of parallel leg portions are staggered in a fore-and-aft direction of the slide valve holder and one of the leg portions that is forward of the other engages the pivot member (61).

BEST MODE FOR CARRYING OUT THE INVENTION

Embodiments of the pipe coupling according to the present invention will be explained below with reference to the accompanying drawings.

FIGS. 1 to 6 show one embodiment of the pipe coupling according to the present invention. As illustrated in the figures, a pipe coupling 1 comprises a female coupling member 2 and a male coupling member 3.

Figure 1:
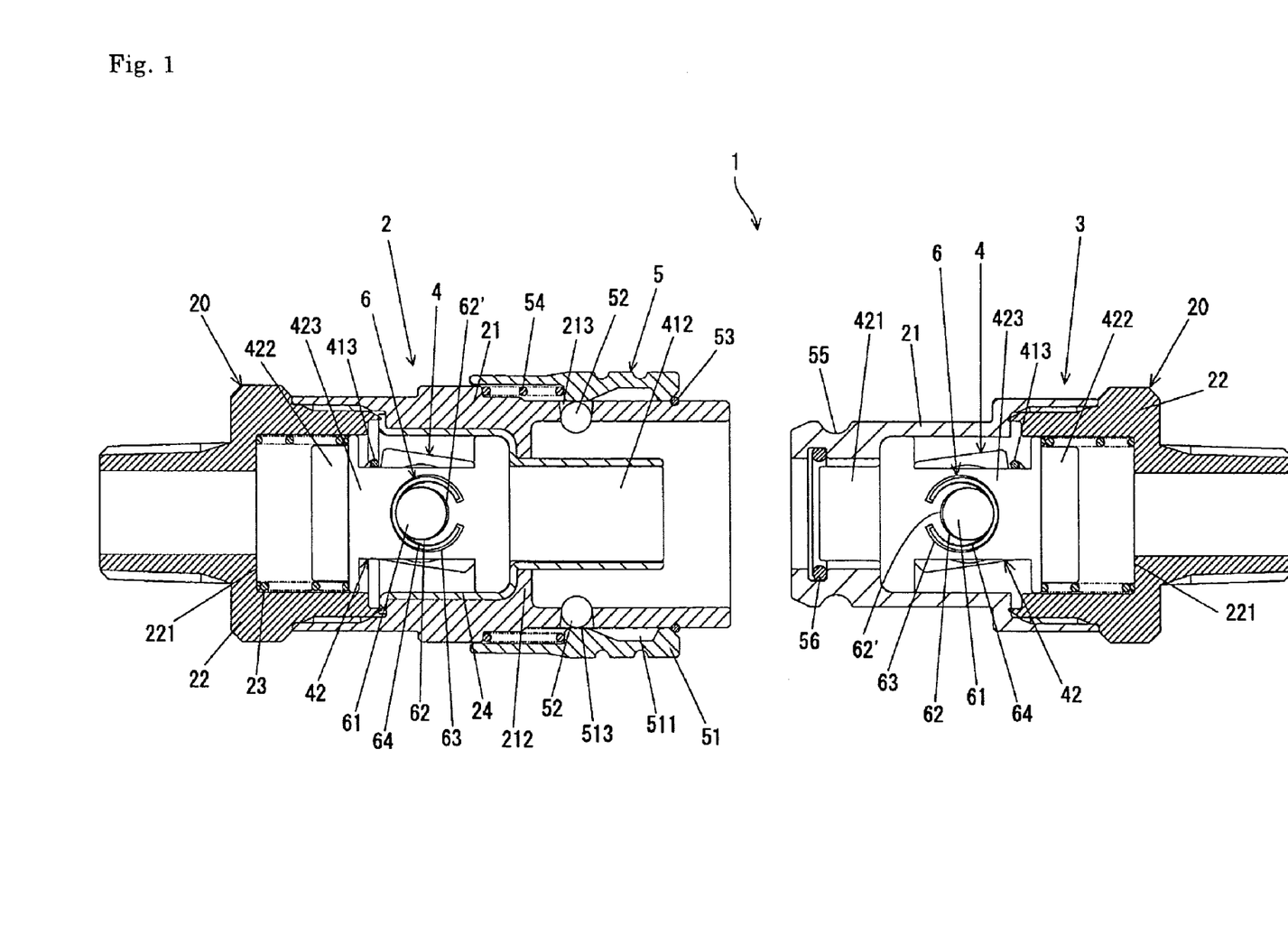
FIG. 1 is a longitudinal sectional view of a pipe coupling in a state where a male coupling member and a female coupling member are not connected to each other, in which valve mechanisms of the coupling members are not sectioned.
Figure 2:
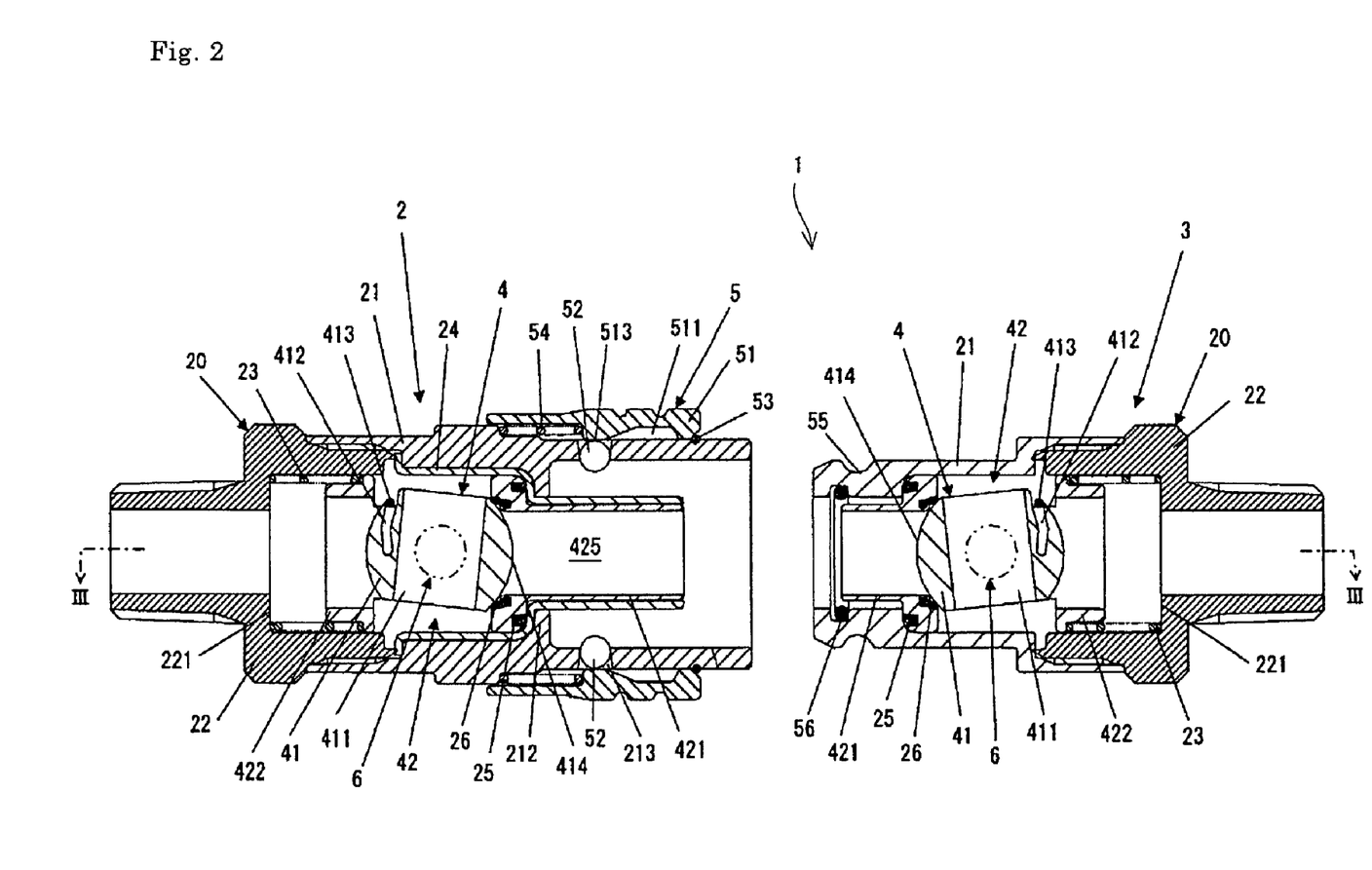
FIG. 2 is a longitudinal sectional view of the pipe coupling in a state where the male and female coupling members are not connected to each other.

The female coupling member 2 has a tubular body 20, a valve housing tube 24, and a valve mechanism 4. The tubular body 20 comprises a tubular main body 21 and a tubular adapter 22 that is thread-coupled to the tubular main body 21 to couple a pipe to the female coupling member 2. The valve housing tube 24 is secured to the inner peripheral surface of the tubular main body 21. The valve mechanism 4 is housed in the valve housing tube 24. The valve housing tube 24 is engaged with an annular retaining portion 212 projecting from the inner peripheral surface of the tubular main body 21, and a flange provided at the rear end of the valve housing tube 24 is held between the tubular main body 21 and the adapter 22, whereby the valve housing tube 24 is secured in the tubular body 20.

The valve mechanism 4 has a slide valve holder 42 housed in the valve housing tube 24 movably in the axial direction of the valve housing tube 24. The slide valve holder 42 supports a rotary valve 41 by support means 6 (described later) rotatably about a pivot axis extending in a direction perpendicular to the axis of the tubular body 20.

The slide valve holder 42 has a forward tubular portion 421, a rear tubular portion 422, and a pair of side wall portions 423 extending between the forward tubular portion 421 and the rear tubular portion 422 to connect them together. The slide valve holder 42 has a through-hole 425 extending in the axial direction of the tubular body 20. The rotary valve 41 is supported between the side wall portions 423. A valve seat 26 (FIG. 2) with an annular seal member is formed around the opening of the through-hole 425 at the rear end of the forward tubular portion 421. A seal ring 25 is set between the valve housing tube 24 and the forward tubular portion 421.

Figure 3:
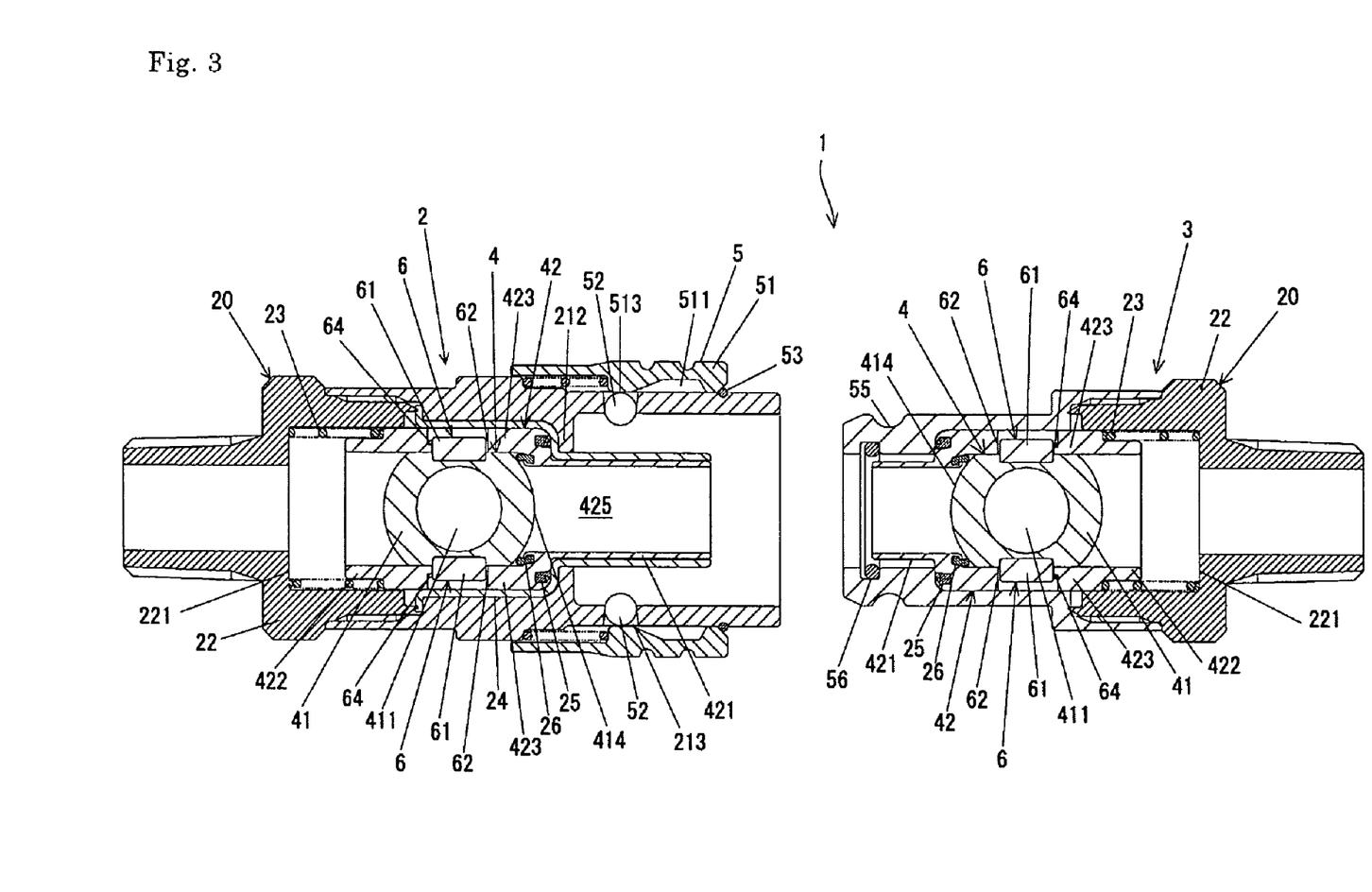
FIG. 3 is a sectional view taken along the line III-III in FIG. 2.
Figure 4:
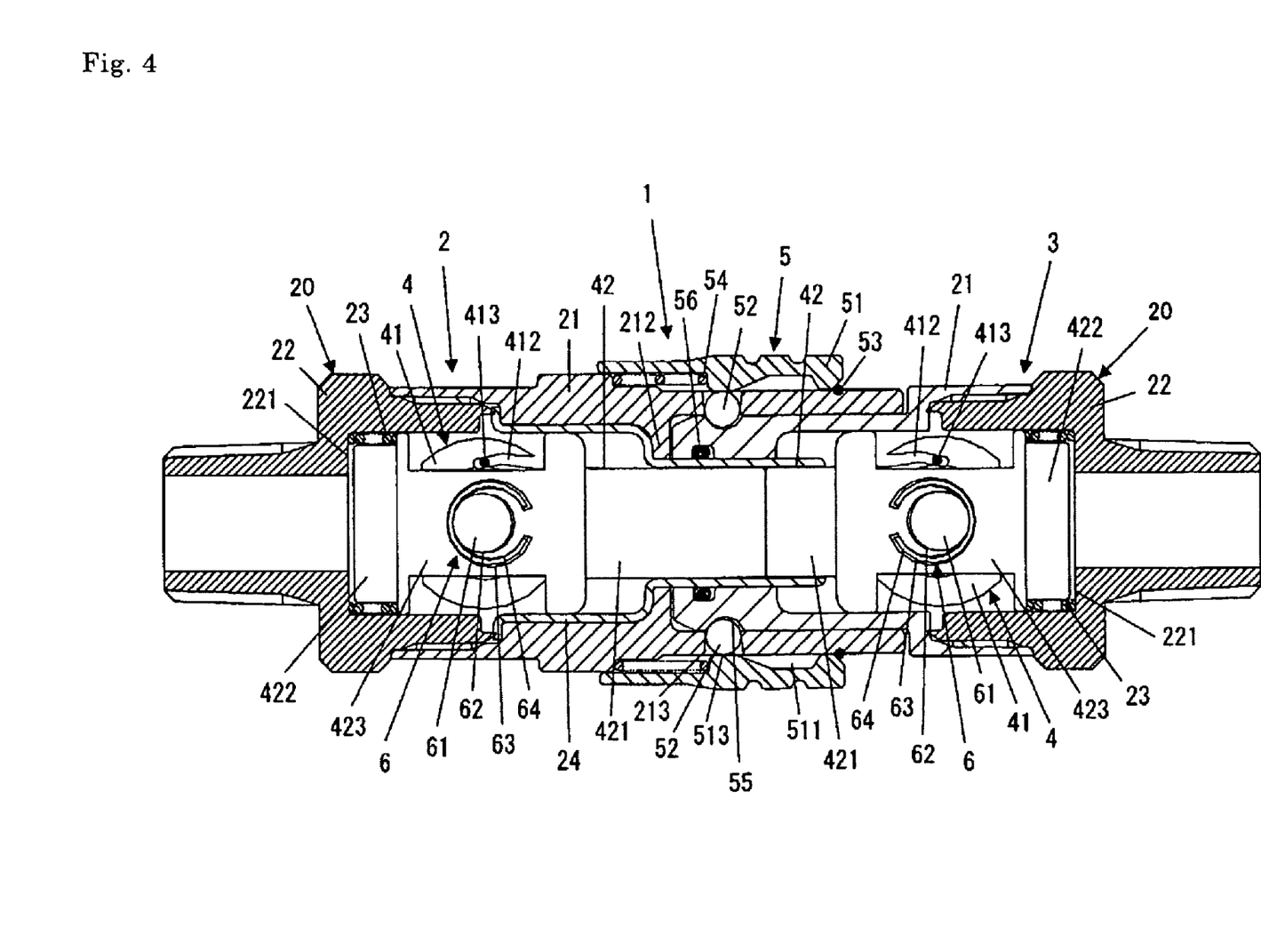
FIG. 4 is a longitudinal sectional view of the pipe coupling in a state where the male and female coupling members are connected to each other, in which the valve mechanisms of the coupling members are not sectioned.
Figure 5:
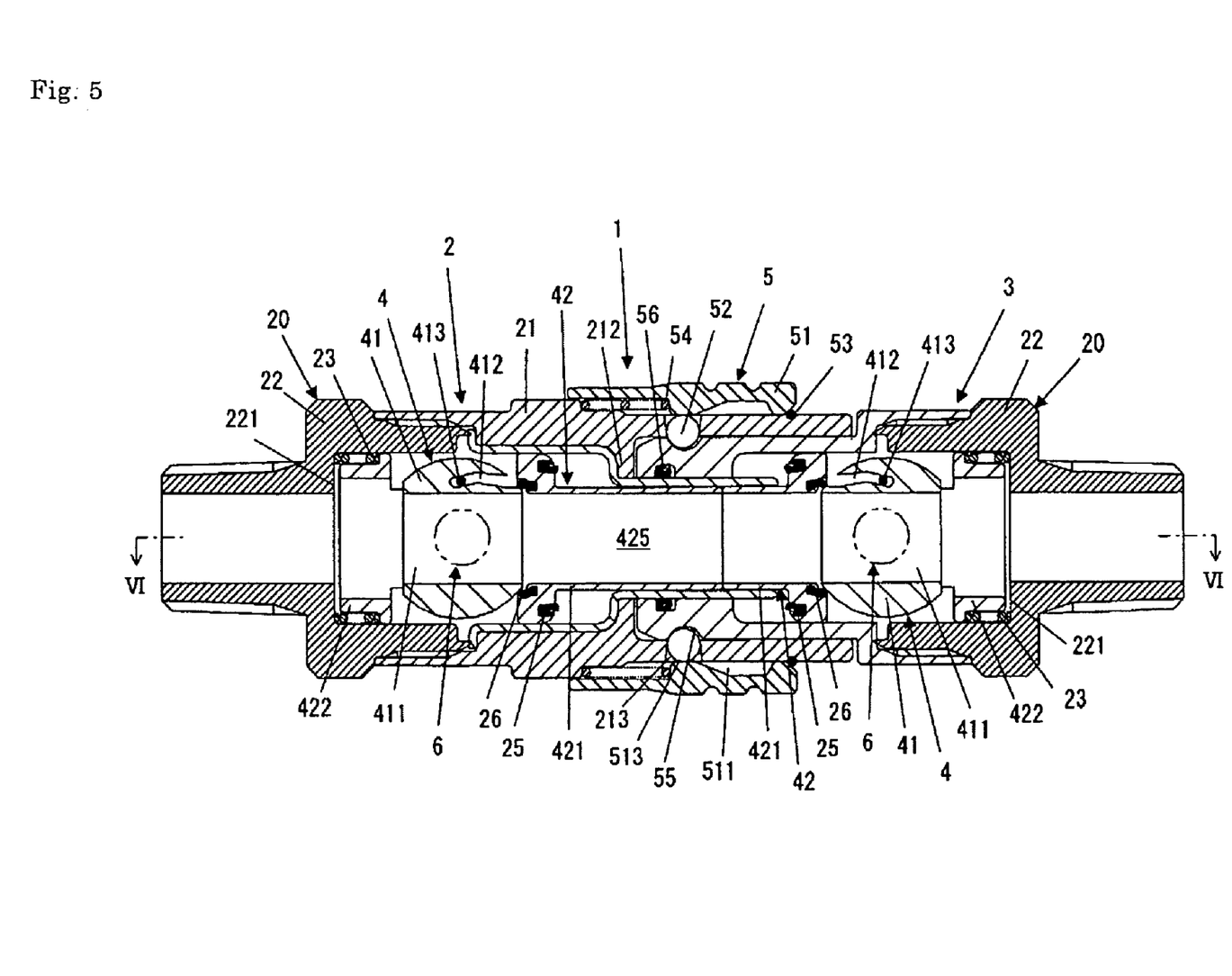
FIG. 5 is a longitudinal sectional view of the pipe coupling in a state where the male and female coupling members are connected to each other.
Figure 6:
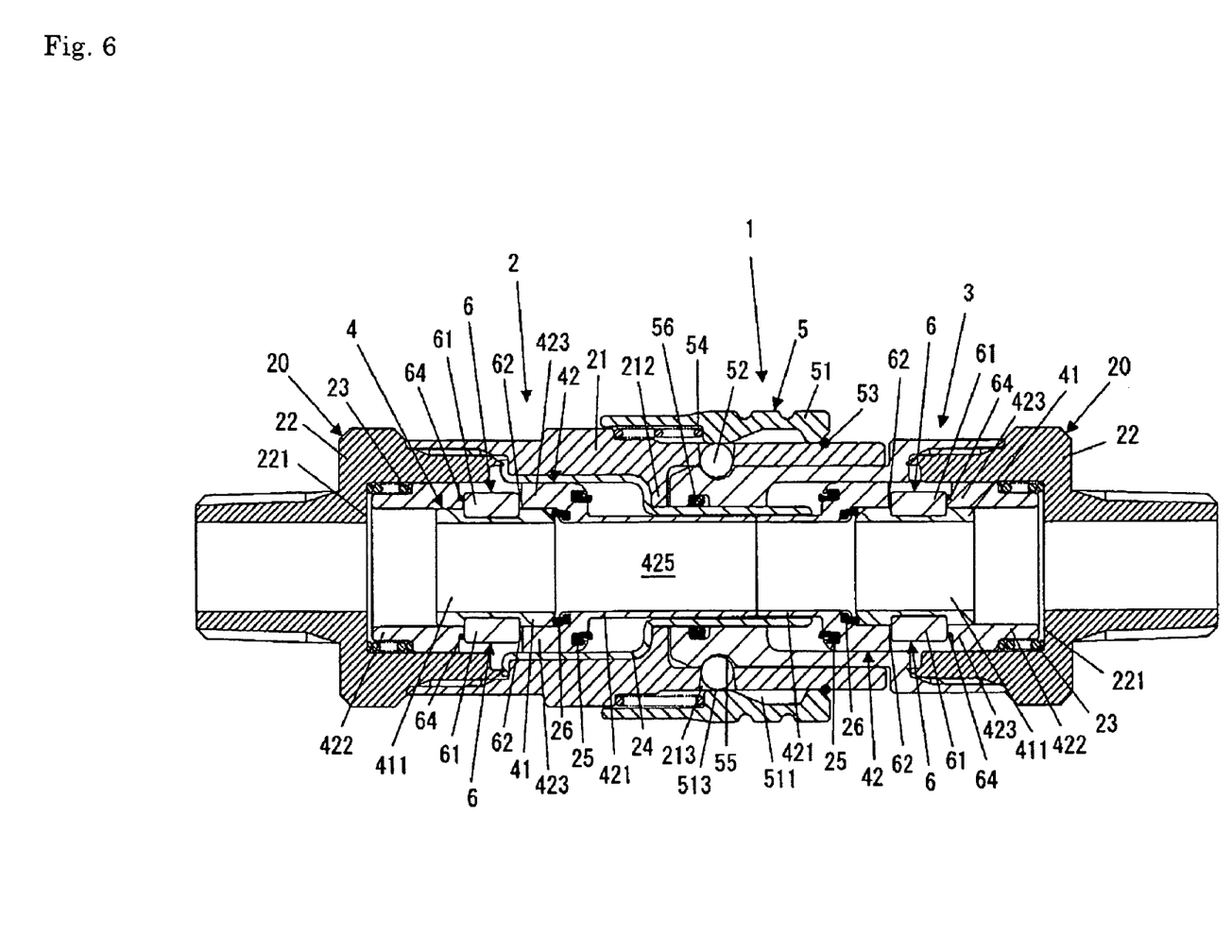
FIG. 6 is a sectional view taken along the line VI-VI in FIG. 5.

When the male coupling member 3 is not inserted in the female coupling member 2, the slide valve holder 42 is placed in a forward position shown in FIGS. 1 to 3 by a coil spring 23. When the male coupling member 3 is inserted into the female coupling member 2, the slide valve holder 42 is pushed rearward by the male coupling member 3 as shown in FIGS. 4 to 6.

The rotary valve 41 is spherical as a whole and has a fluid passage 411 extending in a direction perpendicular to the pivot axis of the rotary valve 41. The rotary valve 41 has a spherical peripheral surface 414 chamfered at both ends of the fluid passage 411. As will be clear from FIGS. 1 to 3 and FIGS. 4 to 6, the rotary valve 41 is rotated in response to the slide valve holder 42 being moved back and forth as stated above. When the slide valve holder 42 is in the position shown in FIGS. 4 to 6, the fluid passage 411 of the rotary valve 41 aligns with the through-hole 425 of the slide valve holder 42. Thus, the rotary valve 41 assumes a position for opening the flow path. When the slide valve holder 42 is in the position shown in FIGS. 1 to 3, the fluid passage 411 of the rotary valve 41 is out of alignment with the through-hole 425 of the slide valve holder 42. Thus, the rotary valve 41 assumes a position for closing the flow path.

The above-described movement of the rotary valve 41 is made by the following cam mechanism.

The cam mechanism comprises a cam slot 412 extending through the rotary valve 41 in the direction of its pivot axis and formed in accordance with a desired cam curve in a section perpendicular to the pivot axis. The cam mechanism further comprises a rectilinear pin 413 extending through the cam slot 412 in parallel to the pivot axis. The pin 413 has both ends thereof positioned in between the forward end portion of the adapter 22 and the flange at the rear end of the valve housing tube 24 and supported on the upper edges (as seen in FIG. 1) of the side wall portions 423 of the slide valve holder 42. When moved rearward together with the slide valve holder 42, the rotary valve 41 is forced to rotate clockwise as viewed in FIG. 1 by the pin 413, which is stationary, whereas, when moved forward, the rotary valve 41 is forced to rotate counterclockwise. In either case, the wall surface of the cam slot 412 slides relative to the pin 413.

The support means 6 includes a pair of pivot members 61 projecting from both sides of the rotary valve 41 along the above-described pivot axis and pivot holes 62 provided in the side wall portions 423 of the slide valve holder 42 to receive the pivot members 61, respectively. The support means 6 further includes spring members 64 that press the pivot members 61 forward, respectively, to press the rotary valve 41 against the valve seat 26.

The longitudinal length of the pivot holes 62 is slightly larger than the diameter of the pivot members 61, so that the pivot members 61 are movable back and force in the pivot holes 62. Each spring member 64 has a C-shape as viewed in FIG. 1 and is set in the slide valve holder 42 in such a manner that both ends thereof are fitted in a pair of spring receiving grooves 63 extending in opposite lateral directions from the rear end of the associated pivot hole 62. More specifically, the pair of spring receiving grooves 63 extend in opposite lateral directions and then forward while curving so that the forward ends thereof come close to each other. Thus, the pair of spring receiving grooves 63 assume the shape of the letter "C" as they extend from the forward end of one spring receiving groove 63 through the pivot hole 62 to the forward end of the other spring receiving groove 63. The spring member 64 is set in the slide valve holder 42 by expanding it and, while doing so, fitting both ends thereof into the spring receiving grooves 63. The portion of the spring member 64 that extends across the pivot hole 62 is in engagement with the rear side of the pivot member 61. Thus, when the slide valve holder 42 is in the closed position as shown in FIG. 1, the spring member 64 presses the rotary valve 41 against the valve seat 26 through the pivot member 61. In this state, as shown in FIG. 1, a slight gap 62' is present between the pivot member 61 and the forward end surface of the pivot hole 62.

Accordingly, when the male coupling member 3 is inserted into and coupled to the female coupling member 2 as shown in FIGS. 4 to 6, the sliding resistance between the valve seat 26 and the rotary valve 41 rotated as the male coupling member 3 is inserted is determined by the elastic force of the spring member 64 that presses the rotary valve 41 against the valve seat 26. As has been stated above, the pipe coupling is designed so that when the male and female coupling members are not coupled to each other, no fluid pressure acts in these coupling members. Therefore, in the decoupled state, the pipe coupling requires no very high sealing performance between the valve seat 26 and the outer surface of the rotary valve 41. Accordingly, it is possible to reduce the elastic force of the spring member 64 for pressing the rotary valve 41 against the valve seat 26. Consequently, the above-described sliding resistance can also be reduced.

Meanwhile, when the pipe coupling is in the state shown in FIG. 1, a slight gap 62' is present between the pivot member 61 and the forward end surface of the pivot hole 62, as stated above. Therefore, when the fluid pressure in the coupling member acts thereon, the rotary valve 41 is pressed against the valve seat 26 by the fluid pressure. Accordingly, more reliable sealing can be obtained.

Reference numeral 5 in the figures denotes a lock mechanism that locks the male coupling member 3 to the female coupling member 2 when the former is inserted into the latter. More specifically, the lock mechanism 5 has locking balls 52 set in radial through-holes 213, respectively, which are formed in the tubular main body 21. The lock mechanism 5 further has an actuating sleeve 51 axially slidably provided on the outer peripheral surface of the tubular main body 21 and a coil spring 54 that urges the actuating sleeve 51 toward the forward end of the female coupling member 2. When the male coupling member 3 is to be inserted into the female coupling member 2, the actuating sleeve 51 is displaced rearward against the coil spring 54 so that a locking ball releasing recessed surface 511 provided on the inner peripheral surface of the actuating sleeve 51 radially aligns with the locking balls 52. In this state, the male coupling member 3 is inserted into the female coupling member 2. Consequently, the locking balls 52 are displaced radially outward by the male coupling member 3. When the male coupling member 3 is inserted as far as the position shown in FIGS. 4 to 6, the locking balls 52 radially align with a locking ball engaging groove 55 formed on the outer peripheral surface of the male coupling member 3. If, in this state, the actuating sleeve 51 is allowed to return to the forward position by the coil spring 54, a locking ball pressing projecting surface 513 radially aligns with the locking balls 52 to make it impossible for the locking balls 52 to come out of the locking ball engaging groove 55, thereby locking the male coupling member 3 and the female coupling member 2 in coupled relation.

When the male coupling member 3 is to be pulled out of the female coupling member 2, the actuating sleeve 5 is displaced rearward against the coil spring 54 so that the locking ball releasing recessed surface 511 radially aligns with the locking balls 52, thereby allowing the male coupling member 3 to be pulled out of the female coupling member 2. Reference numeral 53 in the figures denotes a stop ring that prevents the actuating sleeve 51 from coming off the tubular main body 21.

The male coupling member 3 has substantially the same valve mechanism as that of the female coupling member 2 except that the above-described valve housing tube 24 is not provided and that the male coupling member 3 is provided with a seal ring 56 that sealingly engages the outer peripheral surface of the valve housing tube 24 of the female coupling member 2 when the male and female coupling members 3 and 2 are coupled to each other. In the male coupling member 3, the same constituent elements as those of the female coupling member 2 are denoted by the same reference numerals as used for the female coupling member 2, and a detailed description is omitted herein.

Figure 7:
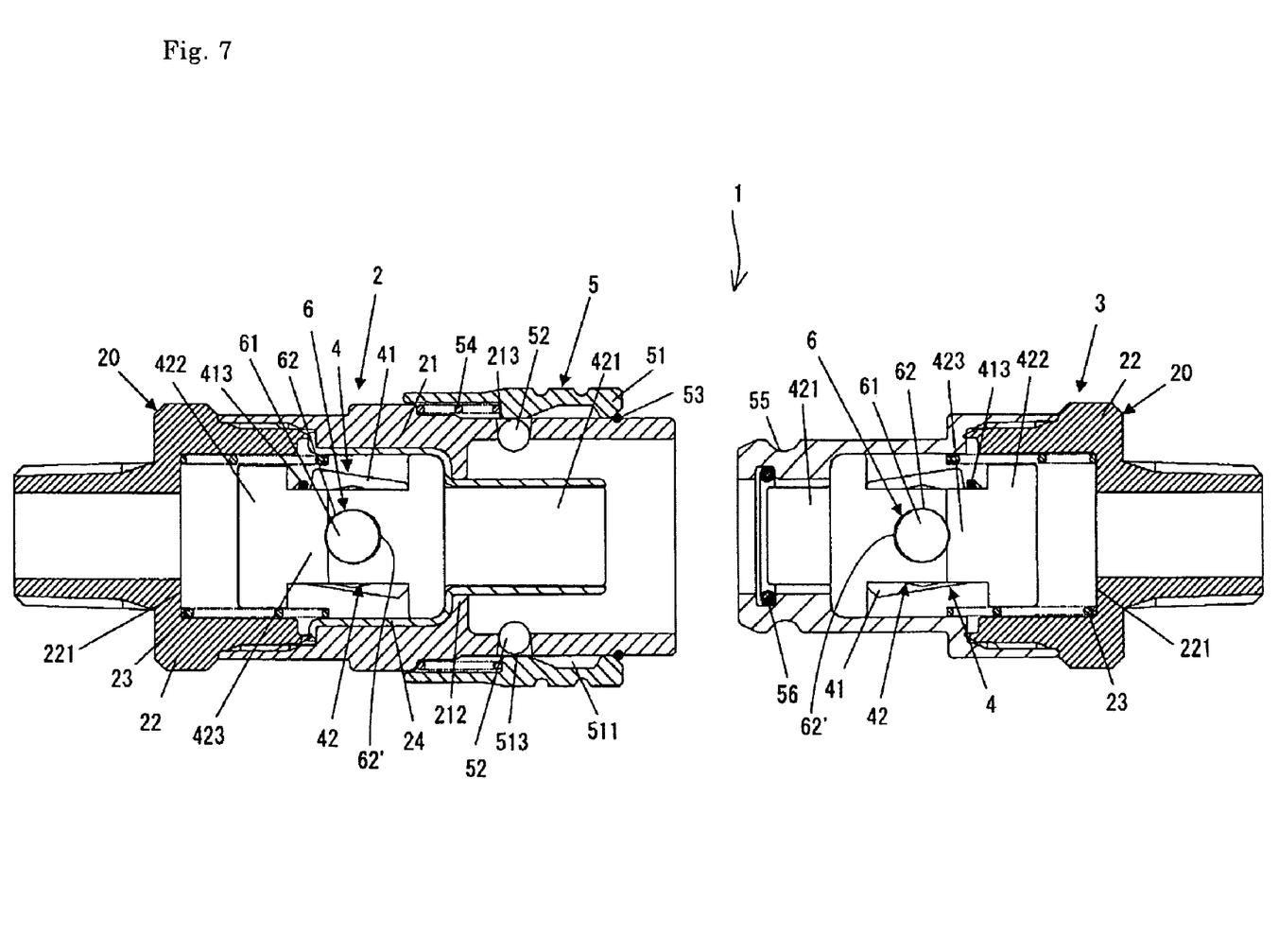
FIG. 7 is a longitudinal sectional view of a pipe coupling according to a second embodiment in a state where a male coupling member and a female coupling member are not connected to each other, in which valve mechanisms of the coupling members are not sectioned.
Figure 8:
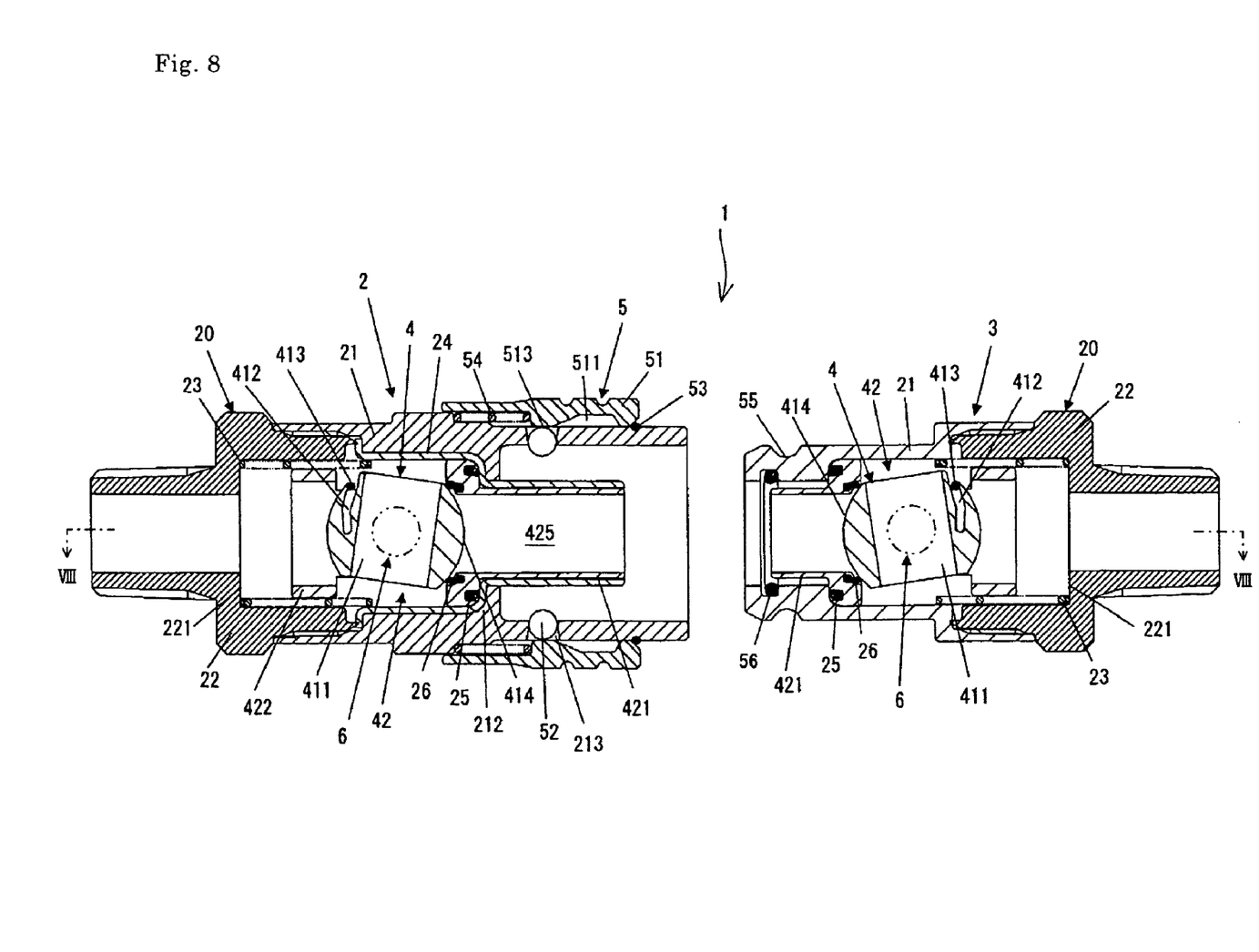
FIG. 8 is a longitudinal sectional view of the pipe coupling shown in FIG. 7, which is in a state where the male and female coupling members are not connected to each other.
Figure 9:
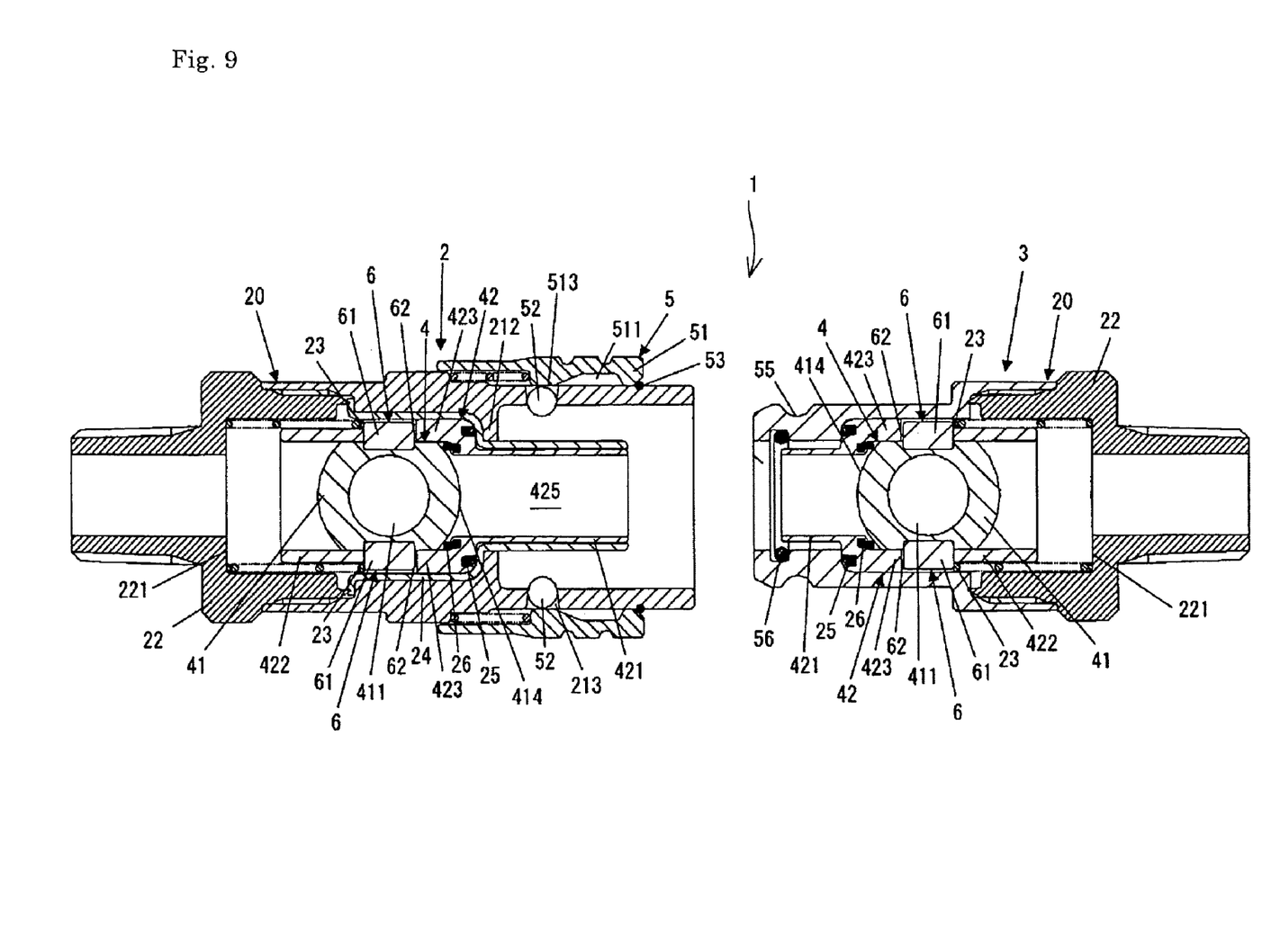
FIG. 9 is a sectional view taken along the line VIII-VIII in FIG. 8.

FIGS. 7 to 9 show a second embodiment of the pipe coupling according to the present invention.

As shown in the figures, in this embodiment, urging means that urges the rotary valve 41 toward the valve seat 26 is formed by using the coil spring 23 that urges the slide valve holder 42 forward. More specifically, the coil spring 23 is, as shown in FIG. 9, set between an inner peripheral step portion 221 of the adapter 22 and the pivot members 61 of the support means 6. Thus, the coil spring 23 urges the rotary valve 41 toward the valve seat 26. Each pivot hole 62 has a longitudinal length longer than the diameter of the pivot member 61 in the same way as in the first embodiment. As shown in FIGS. 7 to 9, when the male coupling member 3 is not connected to the female coupling member 2, the rotary valve 41 is urged toward the forward end of the female coupling member 2 by the coil spring 23 and thus pressed against the valve seat 26. In this state, each pivot member 61 is separated from the forward end of the associated pivot hole 62. Therefore, when the fluid pressure acts in the female coupling member 2 and hence the rotary valve 41 is urged forward by the fluid pressure, the pivot member 61 moves forward in the pivot hole 62. Thus, the rotary valve 41 is strongly pressed against the valve seat 26.

Figure 10:
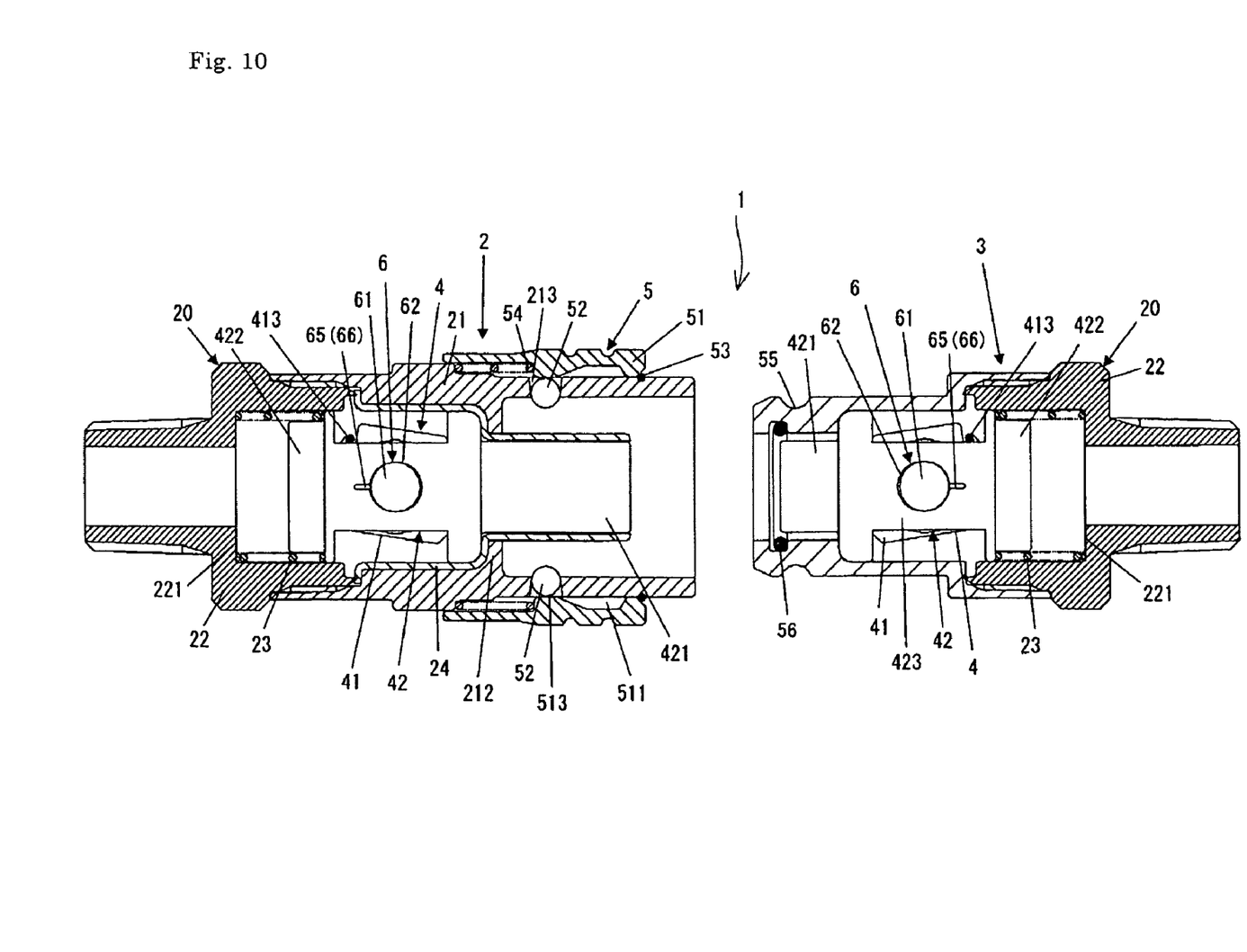
FIG. 10 is a longitudinal sectional view of a pipe coupling according to a third embodiment in a state where a male coupling member and a female coupling member are not connected to each other, in which valve mechanisms of the coupling members are not sectioned.
Figure 11:
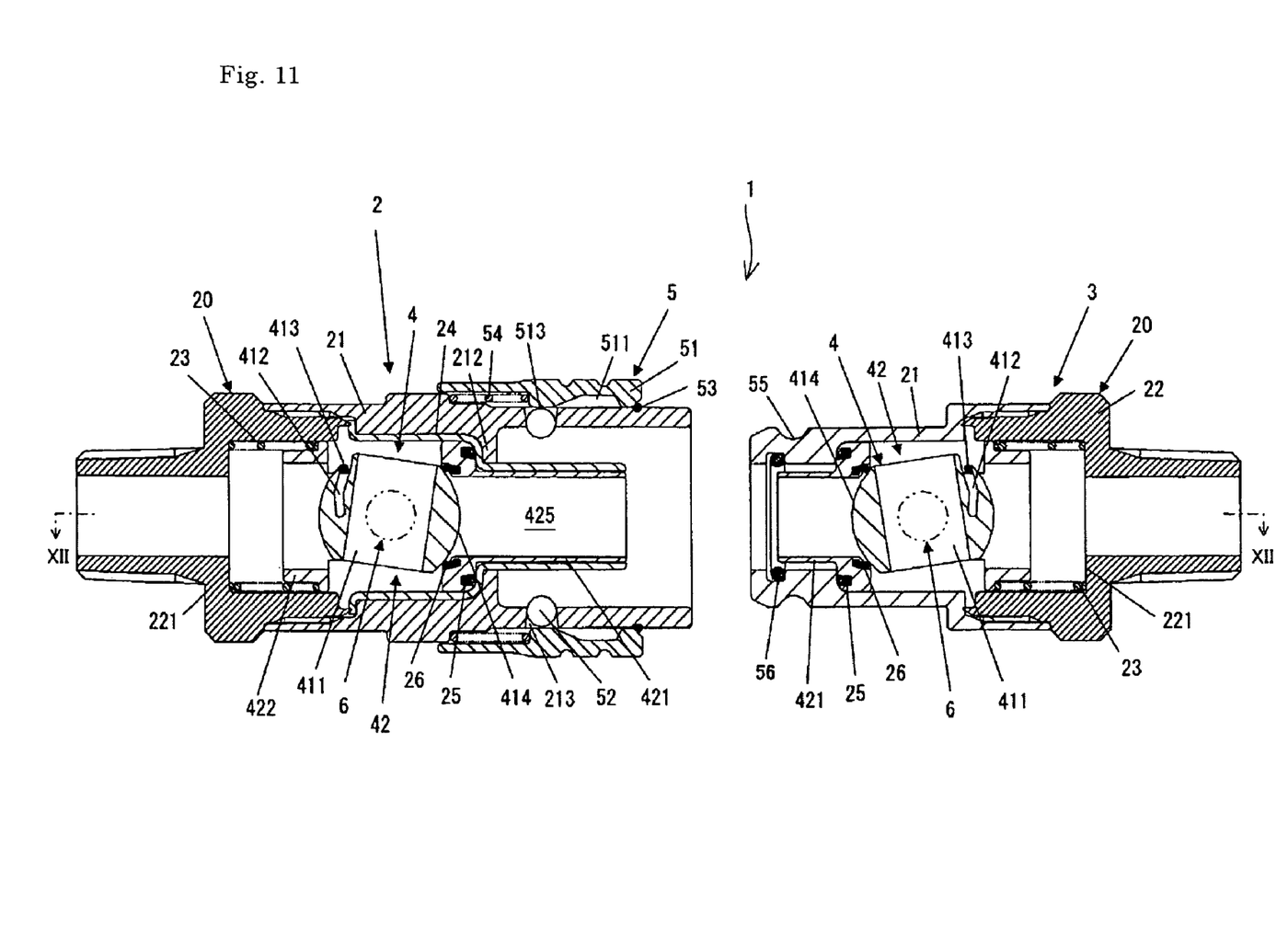
FIG. 11 is a longitudinal sectional view of the pipe coupling according to the third embodiment in a state where the male and female coupling members are not connected to each other, in which the valve mechanisms of the coupling members are not sectioned.
Figure 12:
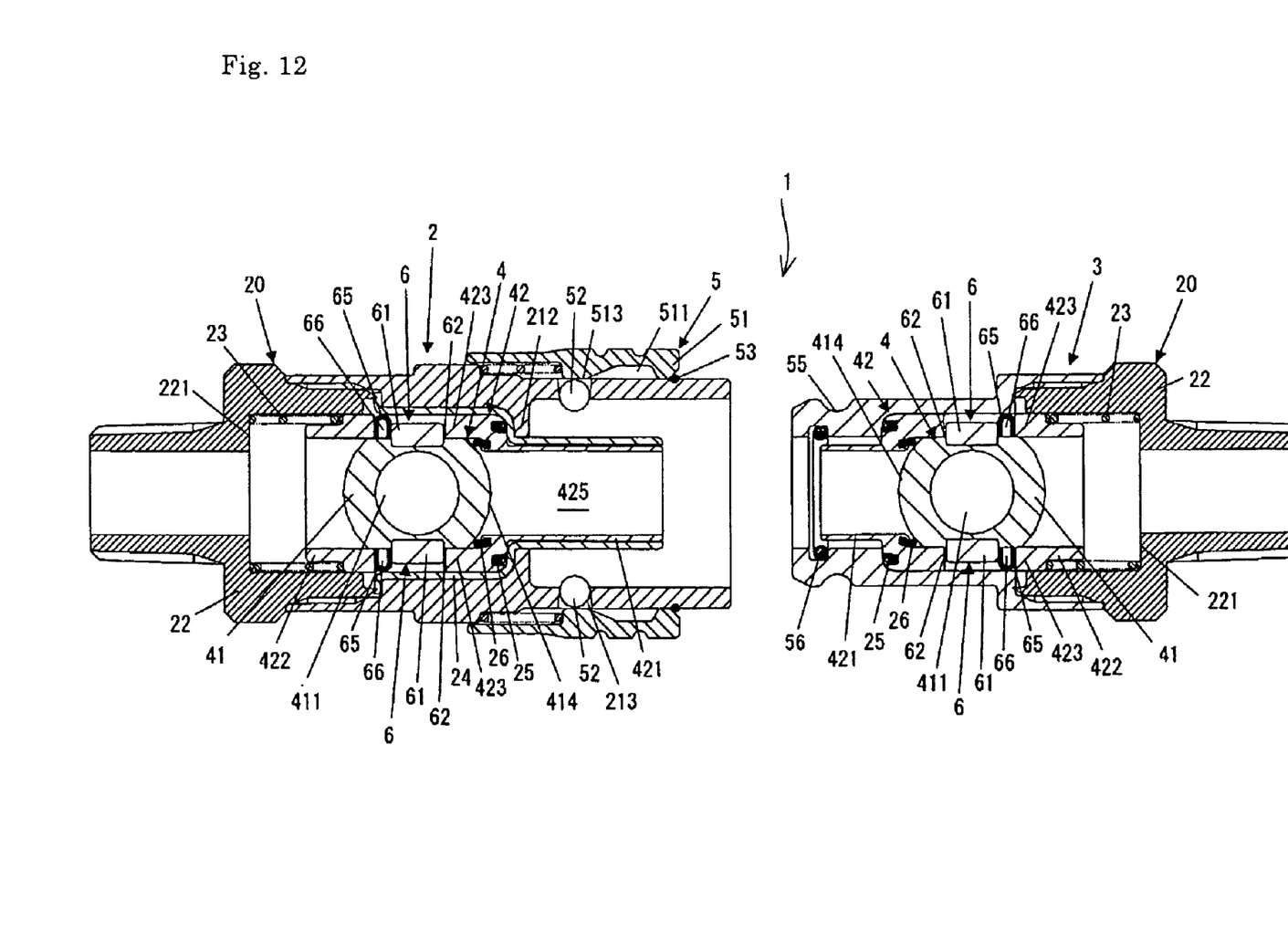
FIG. 12 is a sectional view taken along the line XII-XII in FIG. 11.

FIGS. 10 to 12 show a third embodiment of the pipe coupling according to the present invention. In this embodiment, the slide valve holder 42 is provided with a spring receiving groove 66 that is contiguous with the rear end of each pivot hole 62 of the support means 6, and a substantially U-shaped spring member 65 (FIG. 12) is fitted in the spring receiving groove 66, thereby urging the rotary valve 41 toward the valve seat 26 through the pivot member 61.

Although the present invention has been described above with regard to the embodiments shown in the figures, the present invention is not necessarily limited to the foregoing embodiments but may be properly carried out, provided that the constituent features of the invention set forth in the appended claims are not changed.

The invention claimed is:

1. A pipe coupling comprising a female coupling member and a male coupling member that are connected to each other, wherein at least one of the female coupling member and the male coupling member comprises:
   a tubular body configured to receive the other of the female coupling member and the male coupling member from one end thereof;
   a slide valve holder set in the tubular body slidably in an axial direction of the tubular body, the slide valve holder being slidable between a closed position and an open position where the slide valve holder is pushed rearward of the closed position by the other of the female coupling member and the male coupling member inserted into the tubular body, the slide valve holder having a through-hole constituting a flow path extending in an axial direction of the slide valve holder and an annular valve seat provided around the through-hole;
   a rotary valve having an outer peripheral surface portion that sealingly engages the valve seat and a fluid passage extending through the rotary valve and opening on the outer peripheral surface portion, the rotary valve being rotatable about a pivot axis extending in a direction perpendicular to the axial direction of the slide valve holder while the outer peripheral surface portion thereof slides on the valve seat, so that when the slide valve holder is in the open position, the fluid passage aligns with the through-hole of the slide valve holder to open the flow path, whereas when the slide valve holder is in the closed position, the fluid passage is out of alignment with the through-hole of the slide valve holder to close the flow path; and
   a spring member that presses the rotary valve against the valve seat;
   wherein the rotary valve is displaceable in the axial direction of the slide valve holder, so that the rotary valve can be pressed against the valve seat by a fluid pressure in the tubular body in addition to a pressing force from the spring member.

2. The pipe coupling of claim 1, wherein the rotary valve has a pair of pivot members projecting therefrom along the pivot axis;
   the slide valve holder having pivot holes that receive the pivot members, respectively, the pivot holes each having a length in the axial direction of the slide valve holder that is longer than a diameter of the pivot members, so that the rotary valve is displaceable in the axial direction of the slide valve holder and can be pressed against the valve seat by a fluid pressure in the tubular body.

3. The pipe coupling of claim 2, wherein the spring member is provided between the slide valve holder and each of the pivot members to urge the pivot members forward.

4. The pipe coupling of claim 3, wherein the spring member is set in the slide valve holder so as to extend across an associated one of the pivot holes, so that when the slide valve holder is in the closed position, the spring member engages a rear surface of the pivot member in the pivot hole to press the rotary valve against the valve seat through the pivot member.

5. The pipe coupling of claim 4, wherein the slide valve holder is provided with a pair of grooves extending from each of the pivot holes in opposite lateral directions and in fore-and-aft directions relative to the pivot holes;
   the spring member being an elongated spring set in the slide valve holder by engaging both ends thereof in the pair of grooves.

6. The pipe coupling of claim 5, wherein the pair of grooves extend in opposite lateral directions and forwardly while curving so that forward ends of the grooves come close to each other, thus forming a C-shape configuration which extends from one of the pair of groove to an other of the same through of the pivot; and,
   the spring member is a C-shaped spring and set in the slide valve holder by expanding the spring to make opposite ends thereof far away from each other and fitting both the ends into the pair of grooves, respectively.

7. The pipe coupling of claim 2, wherein the spring member is set between the tubular body and the pivot members to urge the slide valve holder toward the closed position through the pivot members.

8. The pipe coupling of claim 3, wherein the slide valve holder has a spring receiving part that is contiguous with the rear end of each of the pivot holes;

the spring member being received in the spring receiving part in engagement with the pivot member in the pivot hole.

9. The pipe coupling of claim 8, wherein the spring member is a U-shaped spring having a pair of parallel leg portions and a central portion that connects together the leg portions;

the U-shaped spring being received in the spring receiving part such that the pair of parallel leg portions are staggered in a fore-and-aft direction of the slide valve holder and one of the leg portions that is forward of the other engages the pivot member.

\* \* \* \* \*